United States Patent

Baron

(10) Patent No.: US 8,334,003 B2
(45) Date of Patent: *Dec. 18, 2012

(54) DRINK FLAVOURING STRAW

(75) Inventor: Peter Baron, Woollahra (AU)

(73) Assignee: Unistraw Patent Holdings Limited, Federal Territory Of Labuan (MY)

( * ) Notice: Subject to any disclaimer, the term of this patent is extended or adjusted under 35 U.S.C. 154(b) by 20 days.

This patent is subject to a terminal disclaimer.

(21) Appl. No.: 12/606,757

(22) Filed: Oct. 27, 2009

(65) Prior Publication Data

US 2010/0159075 A1      Jun. 24, 2010

Related U.S. Application Data

(63) Continuation of application No. 10/273,350, filed on Oct. 18, 2002, now abandoned.

(30) Foreign Application Priority Data

May 31, 2002 (AU) .................................... PS2706

(51) Int. Cl.
  *A47G 21/18* (2006.01)
  *A23L 1/00* (2006.01)
(52) U.S. Cl. ............ 426/85; 426/89; 426/115; 426/134; 239/33
(58) Field of Classification Search ............ 426/85, 426/115, 134, 89; 239/383, 384, 385, 33; 604/83, 84, 85; 424/400
See application file for complete search history.

(56) References Cited

U.S. PATENT DOCUMENTS

| | | | | |
|---|---|---|---|---|
| 1,000,321 A | * | 8/1911 | Dyer | ............................... 432/65 |
| 1,012,193 A | | 12/1911 | Deffner | |
| 1,254,115 A | | 1/1918 | Brand | |
| 1,333,011 A | * | 3/1920 | Crady | ........................... 210/251 |
| 1,821,551 A | | 9/1931 | Kennedy | |

(Continued)

FOREIGN PATENT DOCUMENTS

BE      884962      12/1980

(Continued)

OTHER PUBLICATIONS

Certificate of Registration for Community Design No. 000422829-0001, Community Designs Bulletin No. 2005/114, Nov. 29, 2005, http://oami.europa.eu.

(Continued)

*Primary Examiner* — Rena Dye
*Assistant Examiner* — Chaim Smith
(74) *Attorney, Agent, or Firm* — Mintz Levin Cohn Ferris Glovsky and Popeo, P.C.; Ingrid A. Beattie

(57) ABSTRACT

The present invention relates to a receptacle which comprises a generally elongate tubular body, a plurality of pellets of a predetermined size and shape containing a predetermined measure of active ingredient and filtration means disposed at or adjacent each end of the tubular body to retain the pellets substantially within the body. The receptacle is sized to allow a carrier liquid to be drawn through it. The passage of the carrier liquid through the receptacle causes the pellets to progressively dissolve, thereby releasing the active ingredient into the beverage upon consumption.

31 Claims, 2 Drawing Sheets

U.S. PATENT DOCUMENTS

| | | | |
|---|---|---|---|
| 1,996,203 | A | 4/1935 | Hollingsworth |
| 2,102,920 | A | 12/1937 | Savage |
| 2,128,448 | A | 8/1938 | Wright |
| 2,436,505 | A | 2/1948 | Rall |
| 2,812,257 | A | 11/1957 | Scisorek |
| 2,867,536 | A | 1/1959 | Mead et al. |
| 2,901,357 | A | 8/1959 | Epstein |
| 2,943,794 | A | 7/1960 | Sussman |
| 3,138,249 | A * | 6/1964 | Paulini ............................. 116/2 |
| 3,398,624 | A | 8/1968 | Stoessel et al. |
| 3,438,527 | A | 4/1969 | Gamblin, Jr. |
| 3,610,483 | A | 10/1971 | Visconti et al. |
| 3,615,595 | A | 10/1971 | Guttag |
| 3,620,770 | A | 11/1971 | Harvey |
| 3,717,476 | A | 2/1973 | Harvey |
| 3,730,737 | A | 5/1973 | Harvey et al. |
| 3,824,322 | A | 7/1974 | Fiorella |
| 4,076,847 | A | 2/1978 | Johnson et al. |
| 4,298,475 | A * | 11/1981 | Gartner ........................ 210/266 |
| 4,789,546 | A | 12/1988 | Medri |
| 4,792,333 | A | 12/1988 | Kidder |
| 4,800,089 | A * | 1/1989 | Scott ................................ 426/78 |
| 4,921,713 | A * | 5/1990 | Fowler ............................ 426/85 |
| 4,981,468 | A | 1/1991 | Benefiel et al. |
| 4,981,698 | A | 1/1991 | Cherukuri et al. |
| 4,995,976 | A | 2/1991 | Vermes et al. |
| 5,045,195 | A | 9/1991 | Spangrud et al. |
| 5,052,614 | A | 10/1991 | Xuan |
| 5,094,861 | A * | 3/1992 | D'Auguste et al. ............. 426/85 |
| 5,156,335 | A | 10/1992 | Smith et al. |
| 5,156,737 | A | 10/1992 | Iana et al. |
| 5,201,460 | A | 4/1993 | Caines |
| 5,433,962 | A | 7/1995 | Stipp |
| 5,478,592 | A | 12/1995 | Kingsley et al. |
| 5,509,605 | A | 4/1996 | Cripe |
| 5,601,207 | A | 2/1997 | Paczonay |
| 5,718,681 | A * | 2/1998 | Manning ....................... 604/518 |
| 5,766,194 | A | 6/1998 | Smith |
| 5,780,058 | A | 7/1998 | Wong et al. |
| 5,792,473 | A | 8/1998 | Gergely et al. |
| 5,910,321 | A * | 6/1999 | Wong et al. .................. 424/473 |
| 5,921,955 | A * | 7/1999 | Mazer et al. ..................... 604/83 |
| 5,965,165 | A | 10/1999 | Zannini et al. |
| 5,985,324 | A * | 11/1999 | Wong et al. .................. 424/473 |
| 5,989,590 | A * | 11/1999 | Wong et al. .................. 424/473 |
| 6,024,721 | A | 2/2000 | Wong et al. |
| 6,106,845 | A | 8/2000 | Wong et al. |
| 6,109,538 | A | 8/2000 | Villani et al. |
| 6,136,345 | A | 10/2000 | Grimmett et al. |
| 6,231,900 | B1 | 5/2001 | Hanke |
| 6,283,294 | B1 | 9/2001 | Thorball et al. |
| 6,322,818 | B1 | 11/2001 | Rebier |
| 6,375,091 | B1 | 4/2002 | Cha |
| 6,460,777 | B2 | 10/2002 | Float et al. |
| 6,482,451 | B1 | 11/2002 | Baron |
| D487,375 | S | 3/2004 | Bengtsson et al. |
| 6,783,783 | B2 | 8/2004 | Clark et al. |
| D497,509 | S | 10/2004 | Nelson |
| D497,764 | S | 11/2004 | Nelson |
| 7,040,547 | B1 | 5/2006 | Nelson |
| D550,496 | S | 9/2007 | Stribling et al. |
| 7,354,007 | B2 | 4/2008 | Pearson |
| D578,333 | S | 10/2008 | Baron |
| 7,452,558 | B2 | 11/2008 | Jani et al. |
| D602,726 | S | 10/2009 | Baron |
| 2001/0014376 | A1 | 8/2001 | Saint-Ramon et al. |
| 2003/0087005 | A1 | 5/2003 | Baron |
| 2003/0203075 | A1 | 10/2003 | Taylor |
| 2006/0065757 | A1 | 3/2006 | Calabrese |
| 2007/0034708 | A1 | 2/2007 | Pearson |
| 2009/0041904 | A1 | 2/2009 | Baron |

FOREIGN PATENT DOCUMENTS

| | | |
|---|---|---|
| CN | 2305117 Y | 1/1999 |
| CN | 2328281 Y | 7/1999 |
| CN | 2330264 | 7/1999 |
| DE | 3731058 A1 | 4/1989 |
| DE | 29616646 U1 | 12/1996 |
| EP | 0584594 A1 | 3/1994 |
| EP | 0670160 B1 | 7/1999 |
| FR | 1176877 | 4/1959 |
| GB | 760428 | 10/1956 |
| GB | 2168027 A | 6/1986 |
| GB | 2198622 A | 6/1988 |
| GB | 2366178 A | 3/2002 |
| HU | 3175 U | 10/2006 |
| HU | 3203 U | 12/2006 |
| JP | 59118113 A | 7/1984 |
| JP | 59114073 U | 8/1984 |
| JP | 60003466 B2 | 1/1985 |
| JP | 63007768 A | 1/1988 |
| RU | 2136561 C1 | 9/1999 |
| WO | WO97/03634 A1 | 2/1997 |
| WO | WO98/15187 A1 | 4/1998 |
| WO | WO03/079957 A1 | 10/2003 |
| WO | WO03/079958 A1 | 10/2003 |
| WO | WO03/101226 A1 | 12/2003 |
| WO | WO04/000203 A1 | 12/2003 |
| WO | WO2007/098564 A1 | 9/2007 |
| WO | WO2008/055296 A1 | 5/2008 |

OTHER PUBLICATIONS

Certificate of Registration for Community Design No. 000422829-0002, Community Designs Bulletin No. 2005/114, Nov. 29, 2005, http://oami.europa.eu.

Certificate of Registration for Community Design No. 000575063-0001, Community Designs Bulletin No. 2006/102, Sep. 12, 2006, http://oami.europa.eu.

Certificate of Registration for Community Design No. 000575063-0002, Community Designs Bulletin No. 2006/102, Sep. 12, 2006, http://oami.europa.eu.

Certificate of Registration for Community Design No. 000784053-0001, Community Designs Bulletin No. 2007/164, Nov. 12, 2007, http://oami.europa.eu.

Certificate of Registration for Community Design No. 000784053-0002, Community Designs Bulletin No. 2007/164, Nov. 12, 2007, http://oami.europa.eu.

Certificate of Registration for Community Design No. 000784053-0003, Community Designs Bulletin No. 2007/164, Nov. 12, 2007, http://oami.europa.eu.

Certificate of Registration for Community Design No. 000784053-0004, Community Designs Bulletin No. 2007/164, Nov. 12, 2007, http://oami.europa.eu.

Certificate of Registration for Community Design No. 000784053-0005, Community Designs Bulletin No. 2007/164, Nov. 12, 2007, http://oami.europa.eu.

Certificate of Registration for Community Design No. 000784053-0006, Community Designs Bulletin No. 2007/164, Nov. 12, 2007, http://oami.europa.eu.

Certificate of Registration for Community Design No. 000784053-0007, Community Designs Bulletin No. 2007/164, Nov. 12, 2007, http://oami.europa.eu.

Certificate of Registration for Community Design No. 000784053-0008, Community Designs Bulletin No. 2007/164, Nov. 12, 2007, http://oami.europa.eu.

Certificate of Registration for Community Design No. 000784053-0009, Community Designs Bulletin No. 2007/164, Nov. 12, 2007, http://oami.europa.eu.

Certificate of Registration for Community Design No. 000935820-0001, Community Designs Bulletin No. 2008/170, Aug. 19, 2008, http://oami.europa.eu.

Certificate of Registration for Community Design No. 000935820-0002, Community Designs Bulletin No. 2008/170, Aug. 19, 2008, http://oami.europa.eu.

Certificate of Registration for Community Design No. 000935820-0003, Community Designs Bulletin No. 2008/170, Aug. 19, 2008, http://oami.europa.eu.

Tetra Pak brochure, Sensory Straw, A sensational drinking experience, 2002 (6 pgs).

Unistraw takes Nestlé to High Court, thegrocer, Jan. 14, 2006, [online]. [retrieved on Mar. 16, 2011]. Retrieved from the Internet: <URL: http://www.thegrocer.co.uk/articles.aspx?page=articles&ID=106825.>.

Magic Straw pictures, Retrieved from gotchocolate.com, [on line], [retrieved on Mar. 17, 2011]. Retrieved from the Internet: <URL: http://www.gotchocolate.com/2010/10/review-got-milk-cocoa-magic-milk-straws/>.

Quick Milk Magic Straws, Retrieved from perpetual kid, no year or month, [on line], [retrieved on Mar. 17, 2011]. Retrieved from the Internet: <http://www.perpetualkid.com/quick-milk-magic-straw.aspx>.

International Search Report mailed Nov. 14, 1997 in related International Application No. PCT/AU97/00680 (publication WO 98/15187).

Communication from EPO pursuant to Article 96(2) EPC issued May 7, 2007 in related European Patent Application No. 03724637.8 (Granted Patent EP1509096).

Response to EPO Communication filed Sep. 11, 2007 in related European Patent Application No. 03724637.8 (Granted Patent EP1509096).

Notice of Opposition filed by MC Scotland Ltd. Mar. 13, 2009 in related European Patent Application No. 03724637.8 (Granted Patent EP1509096).

Notice of Opposition filed by NESTEC S.A. Sep. 10, 2009 in related European Patent Application No. 03724637.8 (Granted Patent EP1509096).

Response to Oppositions filed Mar. 16, 2010 in related European Patent Application No. 03724637.8 (Granted Patent EP1509096).

AG1—Packaging artwork for Felföldi's "Super Candy" Dragees Drink dated Oct. 14, 1997, submitted in Unistraw International Limited v Felföldi Potpourri Kft. Mar. 26, 2008.

AG7—Packaging artwork for Felföldi's "Master Cow" Magic Straw, submitted in Unistraw International Limited v Felföldi Potpourri Kft. Mar. 26, 2008.

AG2-AG25—Photograph and packaging artwork for Felföldi's "Master Cow" Magic Straw, submitted in Unistraw International Limited v Felföldi Potpourri Apr. 18, 2008.

AG29—Affidavit of József Felföldi executed Apr. 24, 2008, and English translation, submitted in Unistraw International Limited v Felföldi Potpourri Kft. Apr. 28, 2008.

* cited by examiner

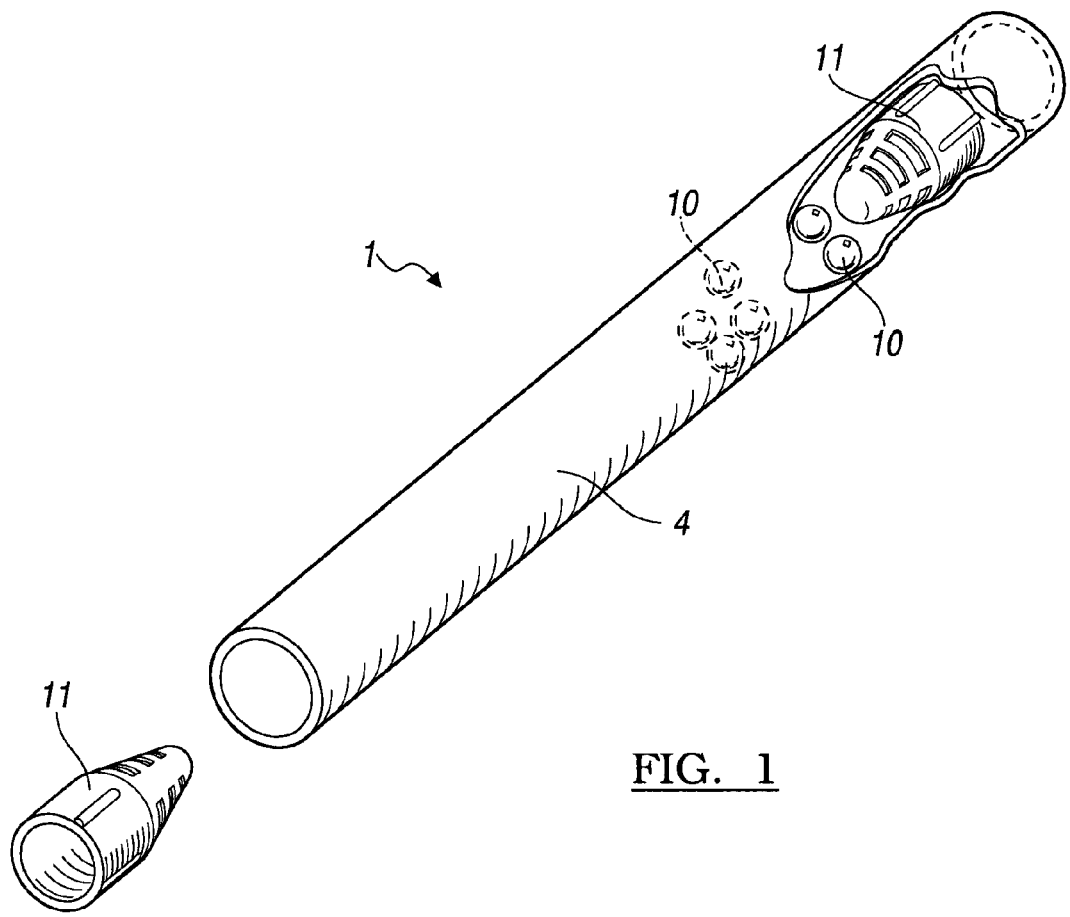
FIG. 1
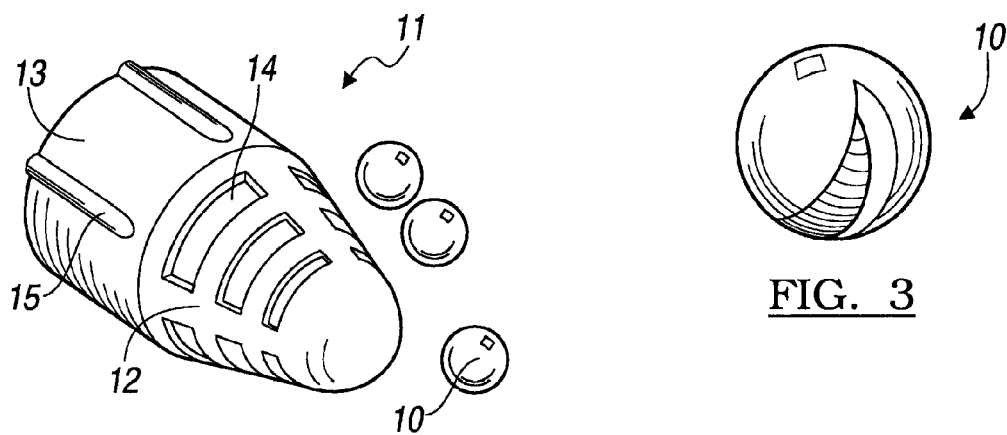
FIG. 2
FIG. 3

DRINK FLAVOURING STRAW

CROSS-REFERENCE TO RELATED APPLICATION

The present application is a continuation of patent application Ser. No. 10/273,350 filed 18 Oct. 2002, and also claims priority to Australian provisional patent application number PS2706 filed 31 May 2002. The entire disclosures of each of the above applications are incorporated herein by reference.

FIELD OF THE INVENTION

The present invention relates generally to the addition of dissolvable agents to fluids.

BACKGROUND OF THE INVENTION

The invention has been developed primarily for use in relation to the flavouring of pre-packaged or bottled beverages such as milk for consumption at the point of sale, and will be described with reference to this application. It will be appreciated, however, that the invention is not limited to this particular use and may be also used to provide flavouring to other beverages, or for the oral administration of dissolvable nutritional, pharmaceutical, health and energy enhancing agents.

A problem with prepackaged beverages, and in particular with milk products sold in TETRA-PACK cartons, is that of hygiene. When the carton is opened, the lip is necessarily contacted by the hands of the user, which may not have been recently cleaned. Moreover, the carton will normally have been handled many times previously during packing, transportation and stacking on shelves. If the consumer then drinks directly from the lip, a hygiene problem is immediately apparent.

In an attempt to address this problem, straws are often used. However, this is not always successful. Retailers periodically run out of stock and are unable to supply the straws. In any case, the straws themselves are often handled or stored in unhygienic conditions. A further problem is that because the retailer is not normally able to charge an additional price for straws, their supply effectively reduces the profit margin. Consequently, there is no incentive for the retailer to supply a straw with each carton, and the consumer is often not mindful or sufficiently motivated to ask.

In order to address the particular hygiene problem associated with the handling of straws, the technique of providing individually pre-wrapped straws is known. However, these are more expensive and consequentially, there is even less incentive for retailers to stock and diligently provide them to customers. Accordingly, they have not found widespread acceptance. Many of the factors outlined above apply not only to milk, but to many other beverages such as mineral waters, cordials, carbonated beverages, juices, colas and the like.

A further problem relates to stock and inventory control. Most ranges of milk, carbonated mineral waters, cordials, and other beverages are produced in a variety of different flavours. Consequently, a considerable amount of valuable refrigeration space is required in retail outlets in order to provide adequate stocks of the full range of flavours for each beverage product line.

In order to address many of these problems, it has been proposed to entrap a suitable flavouring agent within a drinking straw so that as the beverage is consumed, flavouring is progressively added. In the past, several combinations of flavouring agent and entrapment means have been tried. For instance, U.S. Pat. No. 4,921,713 discloses a number of alternatives. One such alternative is a flavour straw incorporating a flavour imparting liner within the straw. However, this configuration has been found difficult in practice to manufacture. It has also been found not to provide sufficient mixing between the plain beverage and the flavouring agent, and consequently does not adequately flavour the drink.

Another proposed alternative is to fill the body of a straw with granular material held between a pair of sponge filters. However, in this case, the granular material restricts fluid flow and the sponge filters are prone to clogging. Such difficulties are enhanced with decreasing size of the granules because the void space between the granules is reduces and the filter necessarily must be finer.

These alternatives highlight two generally conflicting objectives which must be overcome or reconciled. On the one hand adequate mixing of flavouring into the beverage is required in a consistent and controlled manner. And on the other hand, the suction required to draw the beverage through the straw must not be excessive.

Other variations such as U.S. Pat. No. 5,718,681 display a medication delivery straw in which the particles containing the active ingredient are placed into the straw and carried into the mouth of the user as the carrier liquid is consumed. A filter at the bottom prevents the particles from passing out of the straw and into the liquid under gravity whilst allowing fluid to be sucked into the straw. However, the filter is unidirectional and is not required to retain the particles within the straw. Consequently, there is no control over the concentration or rate of delivery of the medicament.

All of these and other similar alternatives display inherent shortcomings, which have hitherto prevented their widespread adoption or commercial success.

It is an object of the present invention to overcome or substantially ameliorate one or more of these disadvantages of the prior art, or at least to provide a useful alternative.

DISCLOSURE OF THE INVENTION

Accordingly, in a first aspect, the invention provides a receptacle including:

a generally elongate tubular body;

a plurality of pellets of predetermined approximate size and shape containing a predetermined measure of an active ingredient; and filtration means disposed at or adjacent each end of the tubular body to retain the pellets substantially within the body, the receptacle being sized to allow a carrier liquid to be drawn therethrough by oral suction, such that passage of said carrier liquid through said receptacle causes the pellets to progressively dissolve, thereby releasing the active ingredient into the liquid upon consumption.

The term "dissolved" and the like as used herein is intended to be construed sufficiently broadly to encompass the situation where small particulate solids are carried in suspension.

Preferably, the carrier liquid is an un-flavoured beverage, the active ingredient is a complementary pelletised flavouring agent, and the receptacle is adapted for use as a drinking straw for the beverage.

Preferably, the pellets are generally spherical and preferably, they have a diameter of between 25% and around 75% of the internal diameter of the straw. More preferably, the diameter of the pellets is around 2 mm to 3 mm.

Preferably, the pellets are formed as "nonpareil" pellets, which is a term known and used in the art of food and confectionery manufacturing to indicate a structure formed by building up successive layers of material. As used herein, the term is intended to embrace a similar meaning in terms of respective layers formed from flavouring, nutritional, pharmaceutical, health and energy supplements in the context of the invention.

Since the pellet is formed layer by layer, the composition of each layer may be varied as required. Advantageously, this enables the dissolution characteristics of the pellet to be controlled so that as it dissolves and its size gradually reduces, the shape of the pellet is retained.

Preferably the innermost layers of the pellet contain flavouring of a greater concentration than that in the outermost layers. Advantageously, this increase in concentration offsets the reduction in surface area of the pellet as it dissolves thereby imparting a relatively uniform concentration of flavouring as consumed by the user.

In another preferred embodiment, the pellet provides an inner flavour band and an outer flavour band, wherein the inner band is of a different flavour to the outer band. In this way, the user consuming a beverage through the straw will experience a different flavour at the outset to that experienced at the end of the beverage. In a particularly preferred embodiment one or more mid bands of flavours are added between the inner and outer bands.

In the preferred embodiment, the filtration means include an end cap retained at each end of the straw. Preferably, each end cap has a sieve portion and a cylindrical mounting portion. Preferably, the sieve portion includes perforations in the form of elongate slots. The elongate slots are preferably configured to be sufficiently small to retain the flavouring pellets or granules within the straw, and sufficiently large to allow relatively unimpeded passage of liquid through the straw. Preferably, the slots are around 1 mm in width and the internal diameter of the straw is preferably around 8 mm.

The sieve portion of each end cap preferably takes the form of an inwardly extending conical formation, to provide an increased surface area for the perforations, and hence a greater cross-sectional flow area for the liquid to pass through into the straw.

In this way, the invention achieves significant advantages over the prior art in that it balances the need for adequate mixing and infusion of the flavouring agent or other active ingredient with acceptably low levels of oral suction. Generally, the prior art provides a flavour straw utilising a fine particle or powder that is prone to clogging and requires a high level of suction. Moreover, the fine powder will require a similarly fine filter at the ends of the straw to prevent the powder being drawn out of the straw and ingested un-dissolved and prematurely. This would result in the beverage having excessive flavour concentration initially, and insufficient concentration subsequently. Such a fine filter further restricts the flow of fluid through the straw and is more likely to become clogged with particles. In addition, the irregular shape of the particles enhances agglomeration further reducing flow and retarding mixing.

By contrast, the present invention advantageously provides a progressive and substantially uniform infusion of flavour through the entire beverage. This is achieved by carefully selecting the size, shape, surface area and construction of flavour pellet in a manner which is complementary to and synergistic with the size and structure of the straw and the filtration means.

Advantageously, this arrangement allows the consumer to control the intensity of flavouring delivered to a beverage by varying the rate at which a liquid is drawn through the straw, and hence the "dwell time" (time for the fluid to pass through the straw) within the straw.

In one embodiment, the receptacle includes an hygienically sealed outer wrapper adapted for removal by the consumer immediately prior to use.

BRIEF DESCRIPTION OF THE DRAWINGS

A preferred embodiment of the invention will now be described, by way of example only, with reference to the accompanying drawings.

FIG. 1 is a perspective cutaway view of a drinking straw according to the invention.

FIG. 2 is a perspective view of an end cap according to the invention.

FIG. 3 is an enlarged perspective view showing one of the nonpareil flavour balls.

PREFERRED EMBODIMENT OF THE INVENTION

Figure 4:
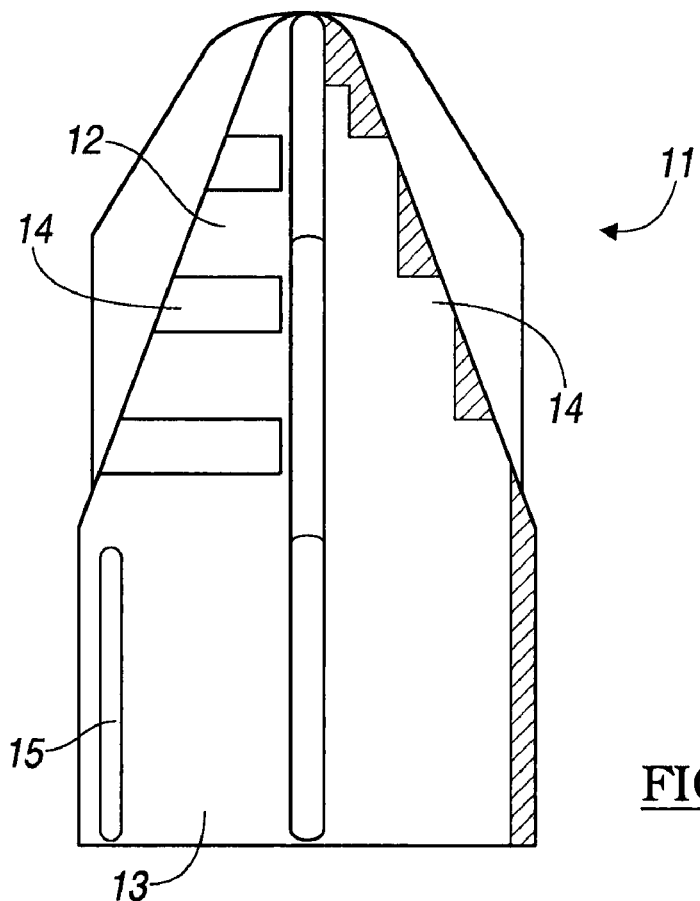
FIG. 4 is a side view of an alternative form of end cap according to a second embodiment of the invention.

Referring to the drawings, the invention provides a flavouring receptacle 1 adapted to contain a predetermined measure of relatively concentrated flavouring agent 10 for use with a relatively unflavoured plain beverage. Typically, the plain beverage is milk, prepacked in a TETRA-PACK type carton. It should be appreciated, however, that other active ingredients and carrier liquids may alternatively be used.

As best seen in FIG. 1, the flavouring receptacle 1 takes the form of an elongate tubular body 4. The tube is initially packaged within a surrounding hygienically sealed disposable wrapper (not shown). The interior volume of the tube is adapted to contain a predetermined measure of the flavouring concentrate, appropriate for the volume of beverage with which the flavouring receptacle is intended to be sold. The overall shape and proportions of the tube enable its use as a straw. In cases where larger volumes of flavouring are required, the tube may be formed in a longer dimension so that use as a straw is still feasible.

In use, it is envisaged that the consumer would purchase a carton of unflavoured beverage such as milk together with a desired flavouring contained with the tubular receptacle or "flavour straw".

Figure 5:
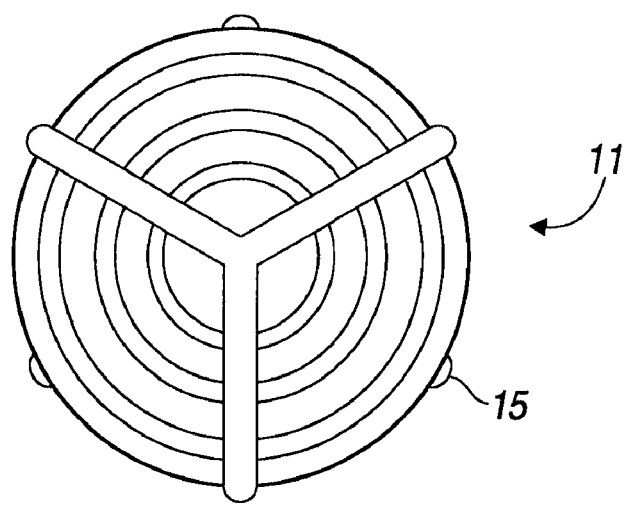
FIG. 5 is a plan views of an alternative form of end cap according to a second embodiment of the invention.

As shown in FIGS. 2 and 3, the flavouring agent takes the form of a plurality of solid, generally spherical pellets 10. The pellets are retained within the straw by filtration means in the form of end caps 11, each including a sieve portion 12 and a cylindrical mounting portion 13. The sieves incorporate perforations, which are sufficiently small to contain the flavouring granules, and sufficiently large to allow relatively unimpeded passage of liquid through the straw. The perforations are in the form of elongate slots 14. As seen in FIGS. 2, 4 and 5, these elongate slots are circumferentially spaced so as to define the sieve portion of the end cap. The difference in shape of the elongate slots and generally spherical pellets advantageously prevents the pellets from clogging the slots as they dissolve. Rather, when the pellets dissolve to a predetermined suitably small diameter, they are able to pass through the slots and out of the straw and safely be ingested by the consumer. This prevents blocking of the sieve as would occur with a foam and finer gauge filters. Accordingly, fluid flow is maintained at all times, while premature consumption of coarse flavouring particles is avoided.

As best seen in FIGS. 2, 4 and 5, the sieve portions of the end caps 11 are generally conical in shape to provide a larger surface area relative to flat end caps of comparable diameter. The larger surface area allows a larger number and/or size of slots, so as to increase the effective cross sectional flow area for the liquid to pass through, which helps to reduce the required oral suction pressure. The end caps may also include additional filtration elements, layers or materials as required. The cylindrical mounting portion 13 of each end cap includes a plurality of circumferentially spaced, longitudinal ridges 15 to engage the inner-bore of the straw, so as to ensure contact at more than one point between the straw bore and the end cap, and thereby facilitate the bonding of the end cap within the straw.

The straw itself is a cylindrical extrusion, ideally of food grade polypropylene, cut into predetermined lengths. The end-caps are also formed from the same food grade polypropylene so that the caps and straw may be welded together, either by ultra-sonic, thermal or other methods of plastic welding. In this way, the end caps and straw become a homogenous unit and the likelihood of an end cap disengaging from the straw and being ingested by the user is eliminated. The plastic is also transparent to enable the user to visually monitor the inside of the straw. It will be appreciated, however, that waxed paper or any other suitable material may be used to form the straw and that the end-caps may be retained in place by other means such as interference fit, a suitable adhesive, heat shrinkage, or suitable combinations of these and other methods.

The concentration of flavouring in the fluid exiting the straw is dependant on: the size, shape and number of pellets used in the straw, the "dwell time" within the straw, the concentration of the flavouring used to make the pellet and the dissolution rate of each pellet.

The spherical shape not only provides a predicable and steady rate of dissolution, it also enhances the flow characteristics of the pellets in bulk form in order to facilitate filling of the straw during production. Furthermore, the spherical shape is resistant to crushing and fragmentation thereby reducing the amount of powder in the straw, which may prematurely dissolve and/or be ingested by the user.

The pellets are sized so as to be complementary with respect to the diameter of the straw. Generally, the pellets have a diameter between 25% and 75% of the diameter of the straw and preferably no smaller than one-third the straw diameter. Typically, the tube has a bore of around 8 mm and the diameter of the pellets is between 2-3 mm. Typically, the end-caps are placed 170 mm apart and around 4 grams of pellets are captively retained within the straw. The slots in the end caps are typically 1 mm in width. It has been found through painstaking development and testing that with this combination, the pellets have appropriate combined surface area to ensure adequate flavour infusion, and are retained until substantially dissolved. In an alternative embodiment, however, the pellets may be non-spherical, for example in tablet or capsule form.

The size of the pellets not only alters surface area but also affects the dwell time of the fluid within the straw. Large pellets will provide looser packing giving larger spaces between the pellets and a more direct route for fluid passing through the straw. Accordingly, larger pellets result in a reduced dwell time and increased flow rate for a given suction. However, if the pellets are made too large with respect to the diameter of the straw, they can block the passage substantially or completely, or provide in adequate surface area.

Two other important factors effecting the exit concentration of fluid are the concentration of the flavouring agent within the pellets and the dissolution rate of the pellet itself. A highly concentrated pellet will impart a higher concentration of flavour to the carrier liquid. Similarly, a pellet, which dissolves more readily, will also provide a higher exit concentration of flavouring, all other variables being equal. In this respect, the straw is intended to be a disposable, one use item. The dissolution rate of the pellets is selected to match a particular volume of milk or other beverage, such that once that volume of milk has passed through the straw, the pellets have dissolved completely or to such an extent that they are small enough to pass through the slots and exit the straw. At this stage, the transparent wall of the straw will allow the user to identify that the straw is devoid of flavouring pellets and ready to be discarded. The spherical pellets of the invention are ideally in the form of nonpareil balls, which enables close control of the above variables in comparison to other shapes and methods of manufacture.

Nonpareil balls are formed by building up a plurality of layers on a "seed". Typically, this seed will be a sugar crystal. However, any other suitable nuclei may be used. Nonpareil pellet formation allows the size of the pellet to be controlled and ensures that shape is generally spherical. Furthermore, the composition of the pellet can be adjusted layer by layer. Layers of flavouring, sweetener or sugar, colouring and starch can be alternated in any order, as required.

This enables flavour concentration, sweetness and dissolution rate to be varied throughout the cross section of the ball. For instance, by providing a ball with a high concentration of flavouring in the centre, uniform milk flavouring can be achieved as the ball reduces in size and its surface area is diminished.

Flavours may also be mixed or changed so that one flavour is added to the beverage initially, and is subsequently replaced by another flavour as the pellets dissolve. The change in flavour may be accompanied by a change in colouring of the pellets and the user may identify this change through the transparent or translucent side wall of the straw. Artificial sweetener may also be used to sweeten the beverage or carrier liquid as it passes through the straw.

Although the invention has been developed primarily for use in relation to flavoured milk, it is obviously applicable to other forms of flavoured drinks such as soy milk, mineral and carbonated waters, sodas, soft drinks, milkshakes, cordials, juices, alcoholic beverages, and the like. It may also be applied to hot beverages such as tea, coffee, hot chocolate, etc.

In addition, while the invention has been described primarily with reference to adding flavouring to a beverage, it will be appreciated that sweeteners, vitamin supplements, nutritional, herbal, pharmaceutical, health and energy additives may equally be applied. In such cases, the transparent sidewalls of the straw are particularly advantageous for assessing that the correct dosage of the agent has been administered. This may be indicated by an empty straw or, as an encouragement to children reluctant to ingest the agent, a visible colour and/or flavour change in the pellets.

Advantageously, the invention provides the user with a degree of control over the intensity of the flavouring, according to the rate at which the beverage is sucked through, and hence the dwell time of the liquid within, the straw. It has also been found that by only partially filling the straw with flavouring granules, the resultant free space provides for enhanced agitation of the granules and hence improved mixing. This in turn results in a more uniform distribution of flavouring within the beverage as the agitated granules perform a stirring function.

Additionally, because the primary forms of the invention contemplate the supply of a flavour straw together with a prepackaged beverage to the consumer, many of the hygiene problems previously associated with this form of packaging are avoided. Furthermore, by permitting the sale of a relatively inexpensive unflavoured beverage together with an effective flavouring agent integrated with a straw, it is envisaged that retailers will be able to achieve substantially enhanced profit margins over the current form of sale of both flavoured and unflavoured beverages, and particularly milk. Further, the consumer can be provided with a greater variety of flavour selection, optionally involving the combination of a number of different flavours, and the possibility of applying the flavouring at any desired concentration. Also, because the flavouring component of the beverage will normally have a longer shelf life, particularly in the case of milk, if any unused product needs to be discarded, wastage of the flavouring component at least can be avoided. Also, because the retailer can stock a relatively large number of plain beverages in the valuable fridge space, with the flavouring receptacles stored elsewhere, stock and inventory control is greatly simplified. The invention is also particularly advantageous in the administration of soluble oral pharmaceuticals and other medical treatments to young children and the elderly, who often have difficulty swallowing such medicaments in conventional tablet or capsule form. In all these respects, the invention represents a commercially significant improvement over the prior art.

Although the invention has been described with reference to specific examples, it will be appreciated by those skilled in the art that the invention may be embodied in many other forms.

The invention claimed is:

1. A receptacle including:
   a generally elongate tubular body;
   a plurality of pellets of a predetermined size and shape containing a predetermined measure of active ingredient, the pellets comprising a nonpareil structure having a plurality of layers said pellets being generally spherical and having an average diameter of between 25% and 75% of the internal diameter of the tubular body; and
   a filter disposed at or adjacent each end of the tubular body to retain the pellets substantially within the body,
   the receptacle being sized to allow a carrier liquid to be drawn therethrough, such that passage of the carrier liquid through the receptacle causes the pellets to progressively dissolve, thereby releasing the active ingredient into the carrier liquid upon consumption.

2. The receptacle according to claim 1, wherein the carrier liquid is an un-flavoured beverage.

3. The receptacle according to claim 1, wherein the active ingredient includes a flavouring agent.

4. The receptacle according to claim 1, being adapted for use as a drinking straw.

5. The receptacle according to claim 1, wherein the pellets have an average diameter of between 2 mm and 3 mm.

6. The receptacle according to claim 1, wherein the filter includes an end cap retained at each end of the body.

7. The receptacle according to claim 6, wherein each of said end caps includes a sieve portion.

8. The receptacle according to claim 7, wherein the sieve portion includes perforations in the form of elongate slots.

9. The receptacle according to claim 8, wherein the elongate slots are configured to be sufficiently small to retain the plurality of pellets within the body and wherein the elongate slots are configured to be sufficiently large to allow relatively unimpeded passage of liquid through the body.

10. The receptacle according to claim 8, wherein the slots are around 1 mm in width.

11. The receptacle according to claim 8, wherein the sieve portion is generally in the form of an inwardly extending conical formation, so as to increase available surface area for incorporation of the slots, and thereby increase effective cross-sectional flow area.

12. The receptacle according to claim 6, wherein each of said end caps includes a generally cylindrical mounting portion.

13. The receptacle according to claim 1, wherein the internal diameter of the body is around 8 mm.

14. The receptacle according to claim 1, wherein the nonpareil pellets each have a plurality of generally concentric layers.

15. The receptacle according to claim 14, wherein the composition of at least one of the layers is different to the composition of other layers.

16. The receptacle according to claim 14, wherein the dissolution characteristics of the pellets are predetermined such that the general shape of the pellets are substantially retained as they dissolve and reduce in size.

17. The receptacle according to claim 14, wherein the concentric layers include at least one outer layer and at least one inner layer, the at least one outer layer having a flavouring and wherein the at least one inner layer of at least some of the pellets contain flavouring of a greater concentration than that in the at least one outer layer.

18. The receptacle according to claim 17, wherein the relative increase in concentration is determined so as substantially to offset a reduction in surface area of the pellets as they dissolve, thereby imparting a relatively uniform concentration of flavouring.

19. The receptacle according to claim 1, wherein the pellets provide an inner flavour band and an outer flavour band, wherein the inner band is of a different flavour to the outer band.

20. The receptacle according to claim 19, wherein one or more mid bands of flavours are added between the inner and outer bands.

21. The receptacle according to claim 1, wherein a consumer can control the intensity of flavouring delivered to a beverage by varying the rate at which the carrier liquid is drawn through the body, and hence the varying the liquid dwell time within the body.

22. The receptacle according to claim 1, wherein the active ingredient includes any one or more ingredients selected from the group comprising: sweeteners, flavouring agents, colouring agents, viscosity modifiers, vitamin supplements, minerals, pharmaceuticals, herbal extracts, nutritional supplements and energy enhancing additives.

23. The receptacle according to claim 1, including a hygienically sealed outer wrapper adapted for removal by a consumer immediately prior to use.

24. A receptacle including:
   an elongate tubular body having a first end and a second end;
   a first filter disposed at the first end of the tubular body and having at least one perforation formed therethrough;
   a second filter disposed at the second end of the tubular body and having at least one perforation formed therethrough;
   a plurality of pellets having an active ingredient and disposed within the elongate tubular body, the plurality of pellets formed as nonpareil balls having a plurality of layers said pellets being generally spherical and having an average diameter of between 25% and 75% of the internal diameter of the tubular body; and wherein the plurality of pellets are configured to progressively dissolve thereby releasing the active ingredient upon a carrier liquid being drawn through the elongate tubular body.

25. The receptacle of claim 24 wherein the nonpareil balls each have a plurality of layers that includes at least one outer layer having a first flavouring and at least one inner layer having a second flavouring, wherein the first flavouring is distinct than the second flavouring.

26. The receptacle of claim 24 wherein the nonpareil balls each have a plurality of layers that includes an outer layer having a first flavouring and an inner layer having a second flavouring, wherein the inner layer has a greater flavour concentration than the outer layer.

27. A receptacle including:
an elongate tubular body having a plurality of pellets captured therein, the plurality of pellets comprising a nonpareil structure having a plurality of layers said pellets being generally spherical and having an average diameter of between 25% and 75% of the internal diameter of the tubular body, wherein the plurality of layers are adapted to progressively dissolve releasing an active ingredient of the nonpareils into a carrier liquid that is drawn through the elongate tubular body.

28. The receptacle of claim 27, further comprising a first filter coupled to one end of the elongate tubular body and a second filter coupled to an opposite end of the elongate tubular body, the first and second filters having perforations that permit passage of the carrier liquid while substantially retaining the plurality of pellets within the elongate tubular body.

29. The receptacle of claim 27 wherein the plurality of layers of the nonpareils are built up upon a seed.

30. The receptacle of claim 27 wherein the plurality of layers includes at least one outer layer having a first flavouring and at least one inner layer having a second flavouring, wherein the first flavouring is distinct than the second flavouring.

31. The receptacle of claim 27 wherein the plurality of layers includes an outer layer having a first flavouring and an inner layer having a second flavouring, wherein the inner layer has a greater flavour concentration than the outer layer.

* * * * *